Patented July 23, 1929.

1,721,742

UNITED STATES PATENT OFFICE.

CLARENCE A. NASH, OF NEWARK, NEW JERSEY, ASSIGNOR TO BAKELITE CORPORATION, OF NEW YORK, N. Y., A CORPORATION OF DELAWARE.

MOLDING MIXTURE.

No Drawing. Application filed December 1, 1926. Serial No. 152,065.

This invention is a novel molding mixture preferably prepared by reacting urea and formaldehyde or their equivalents, in presence of filling materials including cellulose esters.

It is well known that urea and formaldehyde are capable of reacting to yield clear resins which become infusible when sufficiently heated; but the resins thus prepared do not function satisfactorily as binders for the usual fibrous or other fillers such as are commonly used in conjunction with reactive resins of the phenol-aldehyde type. I have found however that by sufficient additions of cellulose esters, properly incorporated into the resin, this defect may be overcome. The molded products made from these novel mixtures by the standard procedures of hot-press molding are moreover superior in their surface characteristics and in their resistance to moisture. I prefer to use cellulose acetate, although the lower nitrates (corresponding to the di-nitro compounds) may be satisfactorily employed. Higher nitration products which are unstable at the molding temperatures of the order of 165° C. or somewhat higher are to be avoided.

The present invention is not limited to any specific composition of molding mixture or to any particular method of securing the necessary intimate incorporation of the cellulose ester into the resin. Preferably however the urea-formaldehyde resin is synthesized in presence of the cellulose ester, as well as of such inert fillers as may be employed. I prefer to proceed as follows:

A mixture is prepared comprising by weight:

| | Parts. |
|---|---|
| Urea | 94 |
| Paraform | 94 |
| Cellulose acetate | 32 |
| Wood flour | 100 |

The above ingredients are thoroughly commingled in a ball mill or other mechanical mixing device, and then transferred to mixing rolls of the differential type and sheeted. The reaction whereby the resin is formed takes place largely or entirely during this sheeting operation, which is continued until the reaction is complete, as indicated by a loss of weight corresponding substantially to the water which is a by-product of this reaction. The sheets are broken up and pulverized in accordance with standard practice. The resulting powder may be molded under substantially the same hot-press conditions as are standard in the art of molding mixtures containing resins of the phenol-aldehyde type.

Additional plasticity may be imparted to these molding mixtures by introducing suitable plasticizing additions into the original mixture. Among such additions I prefer to use ethylene glycol, naphthalene, the di-alkyl esters of oxalic, tartaric or phthalic acids, and the like.

Instead of urea I may use thiourea or in general such homologs or derivatives of urea as are equivalent thereto for the purposes of this invention, and the term urea is used herein to include such equivalents.

I claim:

1. A molding mixture comprising a resin of the urea-formaldehyde type, a filling material, and a cellulose ester which is stable at temperatures below 165° C.

2. A molding mixture comprising a resin of the urea-formaldehyde type, a filling material, a cellulose ester stable at temperatures below 165° C., and a plasticizing agent.

3. A molding mixture comprising a resin of the urea-formaldehyde type, a filling material, a cellulose ester stable at temperatures below 165° C., and a plasticizing agent including a di-alkyl ester of an organic acid.

4. A molding mixture comprising a resin of the urea-formaldehyde type, a filling material, and cellulose acetate.

5. A molding mixture comprising a resin of the urea-formaldehyde type, a filling material, cellulose acetate, and a plasticizing agent.

In testimony whereof, I affix my signature.

CLARENCE A. NASH.